United States Patent
Kang et al.

(10) Patent No.: US 8,787,328 B2
(45) Date of Patent: Jul. 22, 2014

(54) METHOD AND APPARATUS FOR RESERVING DATA CHANNEL IN A WIRELESS ACCESS SYSTEM

(75) Inventors: Dae Ho Kang, Seoul (KR); Sae Woong Bahk, Seoul (KR); Sang Kyu Park, Seoul (KR)

(73) Assignee: Seoul National University R&DB Foundation, Seoul (KR)

( * ) Notice: Subject to any disclaimer, the term of this patent is extended or adjusted under 35 U.S.C. 154(b) by 166 days.

(21) Appl. No.: 13/538,837

(22) Filed: Jun. 29, 2012

(65) Prior Publication Data

US 2013/0010769 A1 Jan. 10, 2013

(30) Foreign Application Priority Data

Jul. 5, 2011 (KR) .................. 10-2011-0066631

(51) Int. Cl.
*H04B 7/212* (2006.01)
*H04W 74/08* (2009.01)
(52) U.S. Cl.
CPC ............................. *H04W 74/0825* (2013.01)
USPC ......................... 370/337; 370/445; 370/458
(58) Field of Classification Search
CPC .......... H04B 7/2643; H04W 72/0446; H04W 74/08; H04W 74/0825; H04L 12/413
USPC ....................... 370/337, 445, 458
See application file for complete search history.

(56) References Cited

U.S. PATENT DOCUMENTS

| | | | |
|---|---|---|---|
| 6,115,390 A * | 9/2000 | Chuah ......................... | 370/443 |
| 6,473,399 B1 | 10/2002 | Johansson et al. | |
| 8,537,791 B2 * | 9/2013 | Seok .......................... | 370/337 |
| 2007/0133459 A1 * | 6/2007 | Kim et al. .................... | 370/329 |
| 2010/0124171 A1 * | 5/2010 | Yoneyama et al. ........... | 370/242 |
| 2012/0051338 A1 * | 3/2012 | Seok .......................... | 370/337 |

FOREIGN PATENT DOCUMENTS

| JP | 2002-532000 A | 9/2002 |
|---|---|---|
| KR | 10-2005-0003575 A | 1/2005 |

OTHER PUBLICATIONS

WO2010/085069, Jul. 29, 2010.*

* cited by examiner

*Primary Examiner* — Chuong T Ho
(74) *Attorney, Agent, or Firm* — Maschoff Brennan

(57) ABSTRACT

Methods for reserving a data channel and apparatuses supporting the same are disclosed. A method for reserving a data channel in a wireless access system includes transmitting a request frame for reserving the data channel by a sending node, and receiving a notify frame in response to the request frame during a first time period or a second time period by the sending node. If the notify frame is received during the first time period, the sending node determines that the request frame has been collided, and if the notify frame is received during the second time period, the sending node determines that the data channel has been reserved successfully.

16 Claims, 13 Drawing Sheets

(a)

(b)

(a) REQUEST frame     (b) NOTIFY frame

METHOD AND APPARATUS FOR RESERVING DATA CHANNEL IN A WIRELESS ACCESS SYSTEM

This application claims the benefit of Korea Patent Application No. 10-2011-0066631, filed on Jul. 5, 2011, which is hereby incorporated by reference as if fully set forth herein.

BACKGROUND OF THE INVENTION

1. Field of the Invention

The present invention relates to methods for transmitting and receiving data in a wireless access system, and more particularly, to methods for efficiently reserving a data channel and apparatuses supporting the same.

2. Discussion of the Related Art

Along with the development of information communication technology, various wireless communication technologies have been developed. Among them, Wireless Local Access Network (WLAN) enables users to connect to the Internet wirelessly through their portable terminals such as Personal Digital Assistants (PDAs), laptop computers, Portable Multimedia Players (PMPs), etc. in homes, offices, or specific service areas.

Since its foundation on February, 1980, the WLAN standardization organization, the Institute of Electrical and Electronics Engineers (IEEE) 802 has been actively working on standardization of WLAN. While WLAN supported 1 to 2 Mbps through frequency hopping, spectrum spreading, infrared communication, etc. in 2.4 GHz according to IEEE 802.11 in the early stage of development, the IEEE 802.11 technology can now support up to 54 Mbps by employing Orthogonal Frequency Division Multiplexing (OFDM).

Besides, the standards of various techniques are under deployment or development in IEEE 802.11, such as Quality of Service (QoS) enhancement, Access Point (AP) protocol compatibility, security enhancement, radio resource measurement, wireless access vehicular environment, fast roaming, mesh networks, interworking with an external network, and wireless network management.

Among the IEEE 802.11 series of standards, IEEE 802.11b supports up to 11 Mbps in the 2.4-GHz frequency band. IEEE 802.11a commercialized after IEEE 802.11b reduces the effects of interference using a 5-Ghz frequency band, instead of the highly congested 2.4-GHz frequency band and increases the communication speed to up to 54 Mbps using OFDM.

However, IEEE 802.11a has the shortcoming of a short communication distance, compared to IEEE 802.11b. Meanwhile, IEEE 802.11g realizes a communication speed of up to 54 Mbps in 2.4 GHz like IEEE 802.11b and satisfies backward compatibility, which attracts much interest to IEEE 802.11g. Furthermore, IEEE 802.11g outperforms IEEE 802.11a in terms of communication distance.

To overcome limits on the communication speed which are a weakness of WLAN, IEEE 802.11n has recently been developed. IEEE 802.11n aims to increase the speed and reliability of a network and extend wireless network coverage. More specifically, IEEE 802.11n is intended to support a High Throughput (HT) of a data processing rate of up to 540 Mbps or higher. To minimize transmission errors and optimize data rate, IEEE 802.11n is based on Multiple Input and Multiple Output (MIMO) using a plurality of antennas at each of a transmitter and a receiver. In addition, IEEE 802.11n may adopt OFDM to increase data rate as well as a coding scheme in which a plurality of redundant copies are transmitted to increase data reliability.

In the IEEE 802.11 standards, the basic access mechanism of the Medium Access Control (MAC) layer is Carrier Sense Multiple Access/Collision Avoidance (CSMA/CA) combined with Binary Exponential backoff (BEF).

The CSMA/CA mechanism is robust and variable because it can provide on-demand services and burst data traffic without any central control. Despite these advantages, the CSMA/CA mechanism may cause much time consumption due to data collision, especially much overhead due to a long backoff in a high-speed WLAN environment.

To make the best of the advantage of high-speed transmission performance, Common Control Channel (CCC)-based MAC protocols have been proposed. In these methods, a total bandwidth is divided into a control channel and a data channel. If a source node is to transmit a data frame, the source node may reserve a data channel by exchanging Request To Send (RTS)/Clear To Send (CTS) control frames on the control channel with a destination node. When the RTS/CTS frames are successfully exchanged, the source and destination nodes switch to the data channel and start to process data. Other nodes may continuously attempt to reserve the data channel through the control channel. This RTS/CTS scheme faces some drawbacks. One of the drawbacks is that the control channel requires a large bandwidth because the RTS and CTS frames are not small in size. Another drawback is that while the destination node is processing a data frame, other nodes may not reserve the data channel using RTS/CTS frames. Considering a WLAN-based mode in which most of processes occur to an Access Point (AP) and other nodes, the above drawbacks are very challenging.

SUMMARY OF THE INVENTION

Accordingly, the present invention is directed to a method and apparatus for reserving a data channel in a wireless access system that substantially obviate one or more problems due to limitations and disadvantages of the related art.

An object of the present invention is to provide an efficient wireless communication method.

Another object of the present invention is to provide new control frame structures for use in data channel reservation, instead of RTS/CTS (Request To Send/Clear To Send) frames in a high-speed communication environment.

Another object of the present invention is to provide a newly defined time duration, Inter-Frame Space (IFS) for data channel reservation.

Another object of the present invention is to provide new data channel reservation methods using newly defined control frame structures and a newly defined time interval.

A further object of the present invention is to provide an apparatus supporting the above methods.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

The present invention relates to various method for efficiently reserving a data channel and apparatuses supporting the same.

To achieve these objects and other advantages and in accordance with the purpose of the invention, as embodied and broadly described herein, a method for reserving a data channel in a wireless access system includes transmitting a request frame for reserving the data channel by a sending node, and receiving a notify frame in response to the request frame during a first time period or a second time period by the sending node. If the notify frame is received during the first time period, it is determined that the request frame has been collided, and if the notify frame is received during the second time period, it is determined that the data channel has been reserved successfully.

The method may further include, if the notify frame is received during the second time period, transmitting a data frame on a data channel by the sending node.

The method may further include monitoring whether another data frame is received on the data channel during a third time period without immediately switching to a control channel, when the data frame is completely transmitted.

The third time period may be configured with a Distribution Coordination Function (DCF) Inter-Frame Space (IFS) (DIFS) and a header detection time required to detect a header of the data frame. The first time period may be a Short IFS (SIFS) and the second time period may be an Intermediate IFS (IIFS).

The IIFS may be configured with the SIFS and a slot time and the slot time may be set, taking into account at least one of a round trip delay, an energy detection time, and a propagation delay.

The request frame may include a first preamble, a random sequence, and a Frame Check Sequence (FCS) and the notify frame may include a second preamble.

In another aspect of the present invention, a method for reserving a data channel in a wireless access system includes receiving a first request frame for reserving the data channel from a sending node by a receiving node, and transmitting a notify frame to the sending node during a first time period by the receiving node, if the first request frame collides with a second request frame received from another sending node, or transmitting the notify frame to the sending node during a second time period by the receiving node, if the first request frame does not collide with the second request frame.

The method may further include, after transmitting the notify frame during the second time period, decoding a header of a data frame received from the sending node, and decoding a body of the data frame if the header indicates the receiving node is a destination or returning to a control channel if the header indicates the receiving node is not the destination.

The method may further include monitoring whether another data frame is received on the data channel during a third time period without immediately switching to the control channel by the receiving node, when the data frame is completely received. The third time period may be configured with a DIFS and a header detection time required to detect a header of the data frame.

The first time period may be an SIFS and the second time period may be an IIFS. The IIFS may be configured with the SIFS and a slot time and the slot time may be set, taking into account at least one of a round trip delay, an energy detection time, and a propagation delay.

The request frame may include a first preamble, a random sequence, and an FCS and the notify frame may include a second preamble.

In another aspect of the present invention, a sending node supporting a method for reserving a data channel in a wireless access system includes a transmission module for transmitting a radio frame, a reception module for receiving a radio frame, and a processor supporting the method for reserving a data channel.

The transmission module transmits a request frame for reserving the data channel, the reception module receives a notify frame in response to the request frame during a first time period or a second time period, and the processor determines that the request frame has been collided, if the notify frame is received during the first time period and determines that the data channel has been reserved successfully, if the notify frame is received during the second time period.

If the notify frame is received during the second time period, the transmission module may transmit a data frame on a data channel.

When the data frame is completely transmitted, the processor may monitor whether another data frame is received on the data channel during a third time period without immediately switching to a control channel. The third time period may be configured with a DIFS and a header detection time required to detect a header of the data frame.

The first time period may be an SIFS and the second time period may be an IIFS. The IIFS may be configured with the SIFS and a slot time and the slot time may be set, taking into account at least one of a round trip delay, an energy detection time, and a propagation delay.

The request frame may include a first preamble, a random sequence, and an FCS and the notify frame may include a second preamble.

In a further aspect of the present invention, a receiving node supporting a method for reserving a data channel in a wireless access system includes a transmission module for transmitting a radio frame, a reception module for receiving a radio frame, and a processor supporting the method for reserving a data channel. The reception module receives a first request frame for reserving the data channel from a sending node, and the transmission module transmits a notify frame to the sending node during a first time period, if the first request frame collides with a second request frame received from another sending node, or transmits the notify frame to the sending node during a second time period, if the first request frame does not collide with the second request frame.

After the notify frame is transmitted during the second time period, the processor decodes a header of a data frame received from the sending node. If the header indicates the receiving node is a destination, the processor further decodes a body of the data frame or if the header indicates the receiving node is not the destination, the processor returns to a control channel.

When the data frame is completely received, the processor may monitor whether another data frame is received on the data channel during a third time period without immediately switching to the control channel. The third time period may be configured with a DIFS and a header detection time required to detect a header of the data frame.

The first time period may be an SIFS and the second time period may be an IIFS. The IIFS may be configured with the SIFS and a slot time and the slot time may be set, taking into account at least one of a round trip delay, an energy detection time, and a propagation delay.

The request frame may include a first preamble, a random sequence, and an FCS and the notify frame may include a second preamble.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Figure 1:
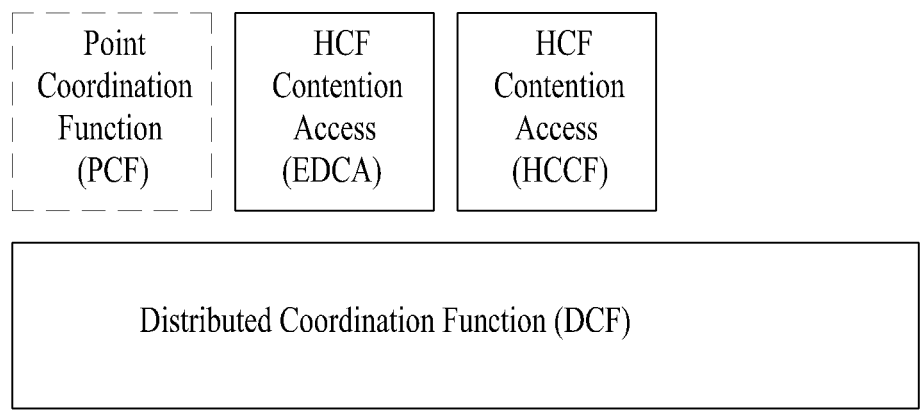
FIG. 1 illustrates the architecture of the Institute of Electrical and Electronics Engineers (IEEE) 802.11 Medium Access Control (MAC) layer, which can be applied to the present invention.

Embodiments of the present invention provide methods for efficiently reserving a data channel and apparatuses supporting the same. To support the methods and apparatuses, new control frame structures and a new time duration are defined according to embodiments of the present invention.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

The embodiments of the present invention will be described in detail with reference to the attached drawings so that those skilled in the art can implement them readily. However, the present invention can be practiced in various forms and thus it is not limited to the embodiments as set forth herein. In the description of the attached drawings, a detailed description of known procedures or steps of the present invention will be avoided lest it should obscure the subject matter of the present invention. In addition, procedures or steps that could be understood to those skilled in the art will not be described either. Also, wherever possible, the same reference numbers will be used throughout the drawings and the specification to refer to the same or like parts.

Through the specification, when it is said that some part "includes" a specific element, this means that the part may further include other elements, not excluding them, unless otherwise mentioned. The term "-er(or)", "module", "unit" or "part" is used to signify a unit of performing at least one function or operation. The unit can be realized in hardware, software, or in combination of both.

In the embodiments of the present invention, a description is made, centering on a data transmission and reception relationship between a Base Station (BS) and a User Equipment (UE). A BS is a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term 'fixed station', 'Node B', 'evolved Node B (eNode B or eNB)', Advanced BS (ABS)', 'Access Point (AP)', etc.

In addition, the term 'UE' may be replaced with the term 'Mobile Station (MS)', 'Subscriber Station (SS)', 'Mobile Subscriber Station (MSS)', 'Mobile Terminal', 'Advanced MS (AMS)', 'terminal', etc.

A transmission end refers to a fixed and/or mobile node that provides data service or voice service and a reception end refers to a fixed and/or mobile node that receives data service or voice service. Accordingly, a UE may serve as a transmission end and a BS may serve as a reception end, on the uplink, whereas the UE may serve as a reception end and the BS may serve as a transmission end, on the downlink.

The embodiments of the present invention can be supported by standard documents disclosed for at least one of wireless access systems, that is, an Institute of Electrical and Electronics Engineers (IEEE) 802.xx system, a $3^{rd}$ Generation Partnership Project (3GPP) system, a 3GPP Long Term Evolution (LTE) system, and a 3GPP2 system. That is, steps or parts that are not described in order to clarify the subject matter of the present invention can be supported by the above documents.

Further, all terms described in this specification can be explained by the standard documents. Especially, the embodiments of the present invention can be supported by one or more of P802.11-2007 and P802.11n-2009 standard documents which are IEEE 802.11 standard documents.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

Specific terms used in the embodiments of the present invention are used to help the understanding of the present invention and they can be replaced with other terms within the spirit and scope of the present invention.

1. CSMA/CA Mechanism

The basic access mechanism of the MAC layer in the IEEE 802.11 series of standards is Carrier Sense Multiple Access/Collision Avoidance (CSMA/CA) combined with Binary Exponential backoff (BEF). The CSMA/CA mechanism is also called Distributed Coordination Function (DCF) of the IEEE 802.11 MAC, basically working as a "listen-before-talk" scheme. In this type of access scheme, a STAtion (STA) listens to a radio channel or a medium before it starts its data transmission.

Upon sensing that the medium is idle, the STA may transmit its data. On the other hand, upon sensing that the medium is busy, the STA enters a deferral period determined by a binary exponential backoff algorithm without transmitting the data.

The CSMA/CA mechanism includes virtual carrier sensing in addition to physical carrier sensing used for an STA to directly listen to a medium. The virtual carrier sensing is complementary to the physical carrier sensing in that the former alleviates the hidden node problem faced by the latter.

For the virtual carrier sensing, the IEEE 802.11 MAC layer uses a Network Allocation Vector (NAV). The NAV is the amount of time a medium will be busy, indicated to other STAs by an STA using the medium or authorized to use the medium. Therefore, a NAV indicates the expected duration of a medium being busy for an STA that transmits the NAV in a frame.

One of NAV setting procedures is an RTS/CTS frame exchange procedure. A Duration Field is included in the RTS and CTS frames to indicate an upcoming frame transmission to receiving STAs. The receiving STAs may defer frame transmissions for a time period indicated by the Duration Field. After the RTS and CTS frames are exchanged, a source STA transmits an actual intended frame to a destination STA.

FIG. 1 illustrates the architecture of the IEEE 802.11 MAC layer.

Referring to FIG. 1, Point Coordination Function (PCF) and Hybrid Coordination Function (HCF) are provided through services of DCF. The HCF is composed of Enhanced Distributed Channel Access (EDCA) and HCF Controlled Channel Access (HCCF). The HCF does not exist in a non-Quality of Service (QoS)-supporting STA, whereas both the DCF and HCF exist in a QoS-supporting STA. Implementation of the PCF is optional to every STA.

For details of the DCF, PCF, EDCA, and HCCF, refer to Part 9: MAC Sublayer Function Description, IEEE 802.11-REVma/D9.0 October 2006.

Figure 2:
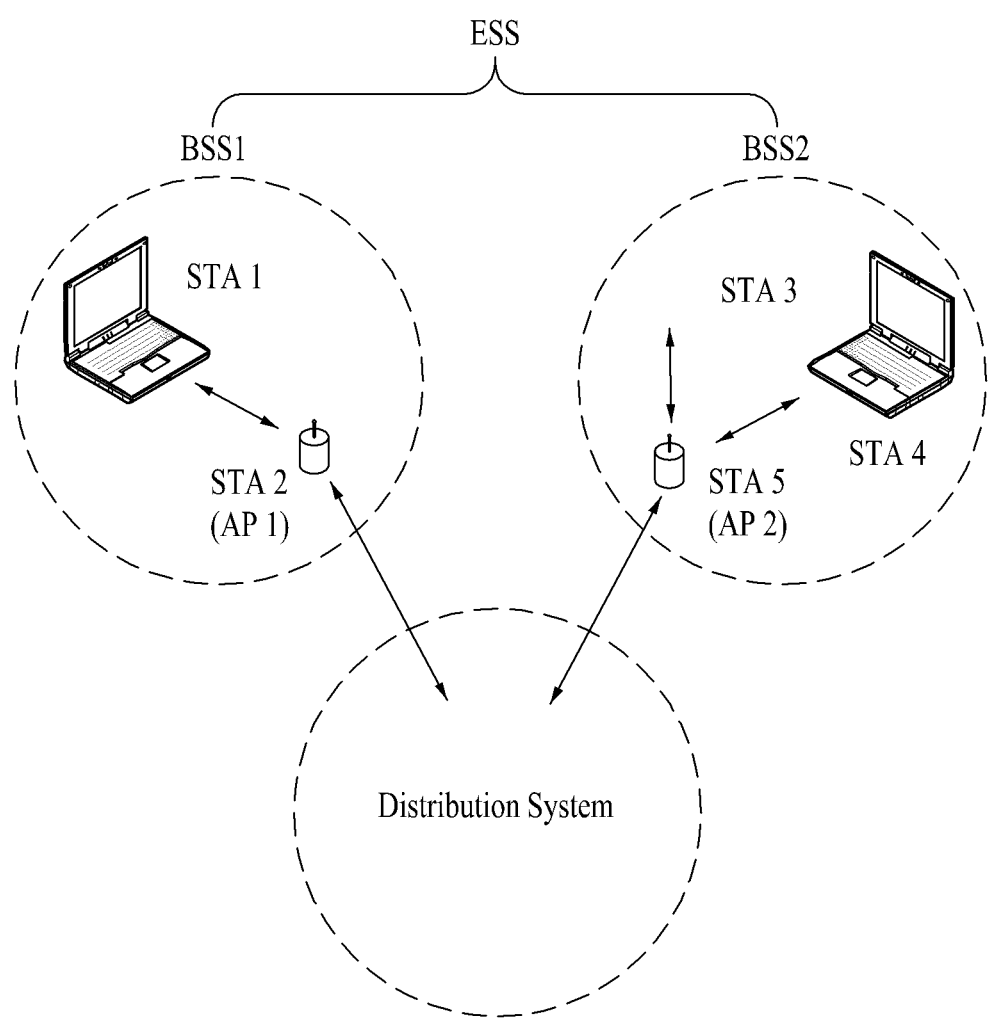
FIG. 2 illustrates an exemplary configuration of a Wireless Local Area Network (WLAN) system to which embodiments of the present invention are applicable.

FIG. 2 illustrates an exemplary configuration of a Wireless Local Area Network (WLAN) system to which embodiments of the present invention are applicable.

Referring to FIG. 2, the WLAN system includes one or more Basic Service Sets (BSSs). A BSS is a set of STAs that are able to communicate with each other through successful synchronization. Thus, the BSS is not an area-oriented concept. A BSS supporting very high-speed data processing at or above 1 GHz is called a Very High Throughput (VHT) BSS.

A VHT system including one or more VHT BSSs may use a channel bandwidth of 80 MHz, which is purely exemplary. For instance, the VHT system may use 60 MHz, 100 MHz, or a wider bandwidth. That is, the VHT system operates in a multi-channel environment having a plurality of subchannels each having, for example, a 20-MHz channel bandwidth.

There are two classes of BSSs: infrastructure BSS and Independent BSS (IBSS). FIG. 2 illustrates an example of infrastructure BSSs. Infrastructure BSSs, BSS1 and BSS2 include one or more STAs, STA1, STA3 and STA4, a plurality of Access Points (APs), AP1 and AP2 that are STAs providing distribution service (herein STA2 and STA5), and a Distribution System (DS) that connects the APs, AP1 and AP2. In contrast, an IBSS does not include an AP and thus all STAs are mobile stations. Since the IBSS is not allowed to connect to a DS, the IBSS forms a self-contained network.

An STA is a functional entity including a MAC layer interface conforming to the IEEE 802.11 standards and a physical layer interface to a wireless medium. In its broad sense, the term "STA" covers an AP station and a non-AP station. As described later, an STA supporting very high-speed data processing at or above 1 GHz is called a VHT STA.

For wireless communication, an STA includes a processor, a transceiver, a user interface, and a display. The processor is a functional unit designed to generate a frame to be transmitted through a wireless network or to process a frame received through the wireless network. The processor performs many functions to control the STA. The transceiver is a unit that is functionally connected to the processor and designed to transmit and receive frames through the wireless network for the STA.

Among STAs, portable terminals manipulated by users may refer to non-AP STAs, STA1, STA3 and STA4. An STA simply refers to a non-AP STA. The term "non-AP STA" is interchangeably used with terminal, Wireless Transmit/Receive Unit (WTRU), UE, MS, mobile terminal, or mobile subscriber unit. As described later, a non-AP STA supporting very high-speed data processing at or above 1 GHz is called a VHT non-AP STA.

The APs, AP1 and AP2 are functional entities that provide their associated STAs with connectivity to the DS via wireless media. Although it is a principle of an infrastructure BSS including an AP via which non-AP STAs communicate with each other, they may communicate directly if a direct link is established between them.

An AP may also be called a centralized controller, a BS, a Node B, a Base Transceiver System (BTS), or a site controller. As described later, an AP supporting very high-speed data processing at or above 1 GHz is called a VHT AP.

A plurality of infrastructure BSSs may be connected to each other through a DS. These BSSs connected through the DS are called an Extended Service Set (ESS). STAs may communicate with each other in the ESS. Non-AP STAs can move from one BSS to another BSS, seamlessly communicating with each other within the same ESS.

The DS is a mechanism in which one AP communicates with another AP. An AP may transmit frames to STAs associated with its managed BSS, an STA that moves from one BSS to another BSS, or an external network such as a wired network, through the DS. The DS is not necessarily a network. As far as it can provide a distribution service defined by IEEE 802.11, the DS may take any form. For example, the DS may be a wireless network such as a mesh network or a physical structure that connects APs to each other.

Figure 3:
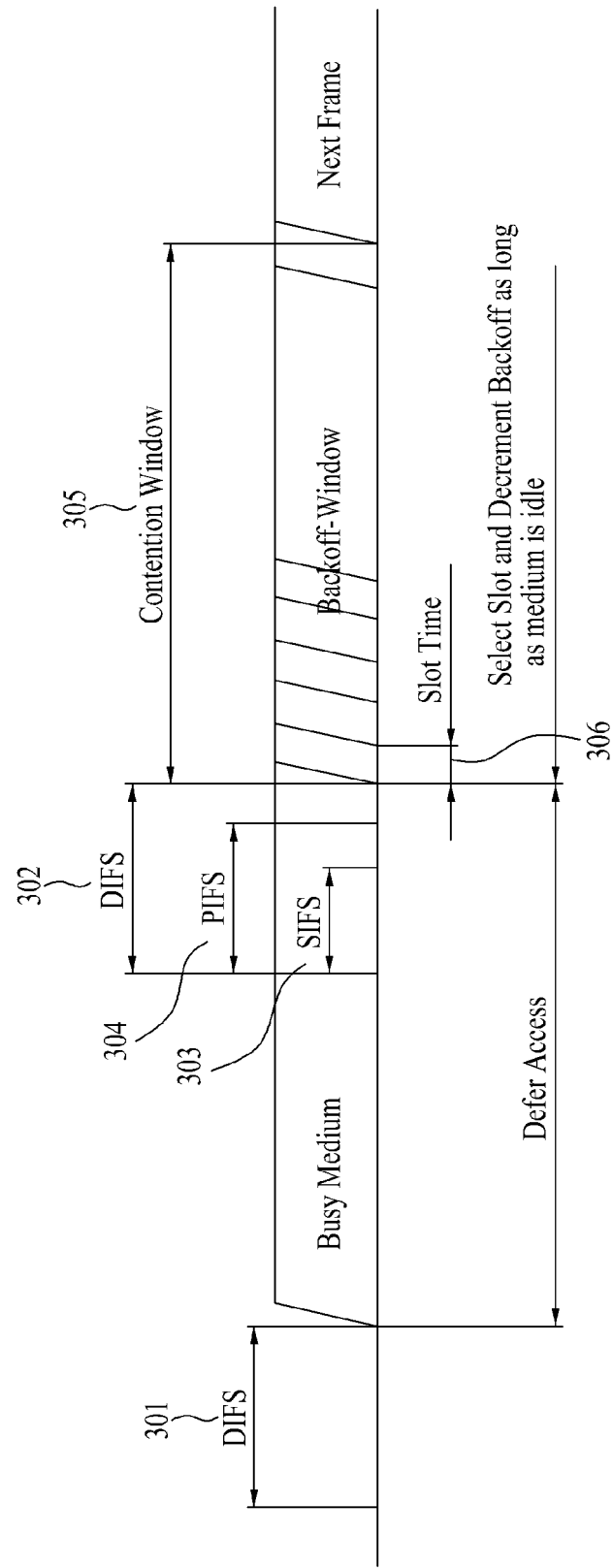
FIG. 3 illustrates a data transmission method according to a communication protocol to which the present invention is applicable.

FIG. 3 illustrates a data transmission method according to a communication protocol to which the present invention is applicable.

In IEEE 802.11 standards, a time duration is called Inter-Frame Space (IFS). According to the lengths of the time duration, DCF IFS (DIFS), Short IFS (SIFS), PCF IFS (PIFS), and Extended IFS (EIFS) are defined.

STAs may use DIFSs 301 and 302 to transmit data frames (MAC PDUs (MPDUs)) and management frames (MAC Management PDUs (MMPDUs)) in a DCF operation. If the CS mechanism of an STA determines that a medium is in idle mode within a TxDIFS slot range, the STA using a DCF may be allowed to transmit a frame after a successfully received frame and after a backoff timer expires.

Only an STA operating in PCF mode may observe a PIFS 304 to gain a priority access to a medium at the beginning of a Contention-Free Period (CFP) or to transmit a channel switch announcement frame.

An SIFS 303 is a time duration from the end of the last symbol of the previous frame to the beginning of the first symbol of a preamble in the current frame. The SIFS may be used before transmission of an ACKnowledgment (ACK) frame, a CTS frame, and a second or subsequent MPDU of a segmented burst. A Point Coordinator (PC) may use the SIFS for any type of frames during a CFP.

A major example of using the SIFS 303 is that an STA receives an MPDU with a Receiver Address (RA) set to the STA and replies to a Transmitter Address (TA) with an ACK frame. As long a time duration as the SIFS is observed between the data frame and the ACK frame.

For collision avoidance, a Clear Channel Assessment (CCA) detection function and a NAV setting function are used. The CCA detection function is to sense a carrier and determine whether the medium is busy. The NAV setting function is to reserve a channel by explicitly indicating a medium busy duration in the header of a transmitted frame. The NAV setting function is significant in solving the hidden node problem.

In FIG. 3, a contention window 305 is a time interval during which one or more users operate in a contention-based manner. If two or more data collide with each other in the contention window 305, a backoff scheme may be used. That is, collided data is retransmitted a predetermined time later.

2. Control Frame Structures

Figure 4:
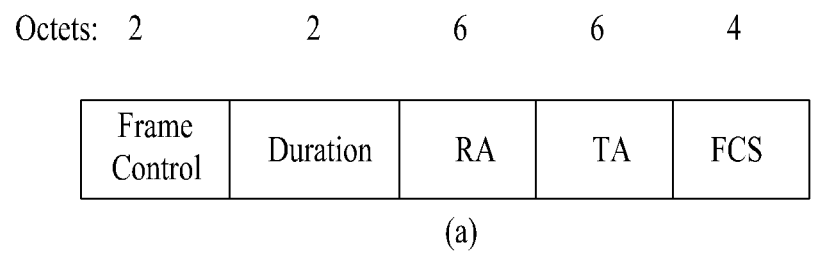
FIG. 4 illustrates exemplary structures of a Request To Send (RTS) frame and a Clear To Send (CTS) frame in an IEEE 802.11 system.
Figure 4:
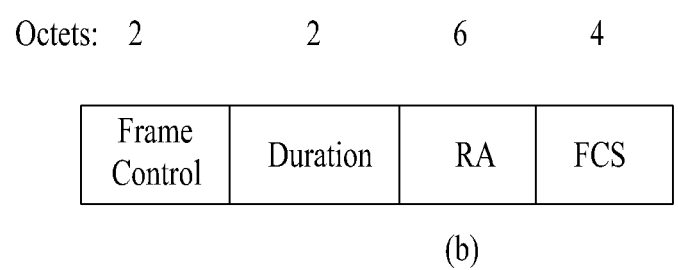

FIG. 4 illustrates exemplary structures of a Request To Send (RTS) frame and a Clear To Send (CTS) frame in an IEEE 802.11 system.

FIG. 4(a) illustrates an exemplary RTS frame structure. The RTS frame may include a Frame Control (FC) field, a Duration field, an RA field indicating the address of a recipient, a TA field indicating the address of a sender, and a Frame Check Sequence (FCS) field. The FC, Duration, RA, TA, and FCS fields may be respectively 2, 2, 6, 6, and 4 octets long. The FC field includes information about the protocol version, type, subtype, To DS or From DS, retry, power management, etc. The RA is the address of an STA, on the wireless medium, that is an intended immediate recipient of the current data or management frame. The TA is the address of an STA transmitting the RTS frame. The FCS field is attached to the RTS frame, for error check and error correction. The FCS is calculated over all the fields of a MAC header and a Frame Body field in the frame. The FC field, the Duration field, the RA field, and the TA field of the RTS frame may form the MAC header.

FIG. 4(b) illustrates an exemplary structure of the CTS frame. The CTS frame may include an FC field, a Duration field, an RA field indicating the address of a receiver, and an FCS field. The FC, Duration, RA, and FCS fields may be respectively, 2, 2, 6, and 4 octets long.

The FC field includes information about the protocol version, type, subtype, To DS or From DS, retry, power management, etc. The RA field is copied from the TA field of the immediately previous RTS frame. The FCS field is attached to the CTS frame, for error check and error correction. The FCS is calculated over all the fields of a MAC header and a Frame Body field in the frame. The FC field, the Duration field, and the RA field of the CTS frame may form the MAC header.

Figure 5:
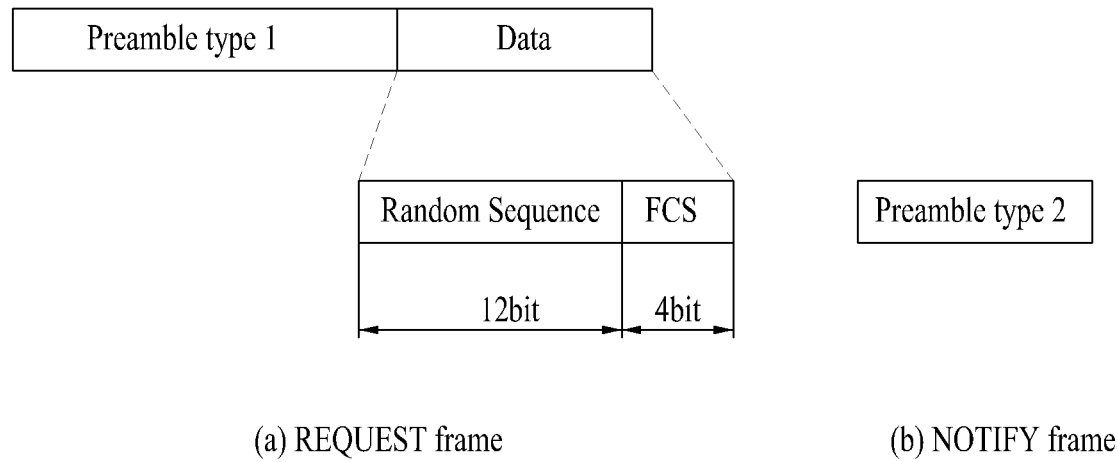
FIG. 5 illustrates the structures of new control frames according to an embodiment of the present invention.

FIG. 5 illustrates new structures of control frames according to an embodiment of the present invention.

FIG. 5(a) illustrates a new control frame structure for use instead of the RTS frame illustrated in FIG. 4(a). The new control frame will be referred to as a REQUEST frame. The REQUEST frame may comprise a Preamble Type 1 field and a Data field. The Data field may further be divided into a Random Sequence field that is randomly configured and an FCS field. That is, the REQUEST frame may be configured only with the preamble type 1 field, the random sequence field, and FCS field.

FIG. 5(b) illustrates a new control frame structure for use instead of the CRTS frame illustrated in FIG. 4(b). The new control frame will be referred to as a NOTIFY frame. The NOTIFY frame may be configured to only a Preamble Type 2 field.

If one or more Sending Nodes (SNs) transmit REQUEST frames simultaneously, collision can be occurred between the REQUEST frames. Then a Receiving Node (RN) may determine from the FCS fields of the collided REQUEST frames that collision has occurred. The NOTIFY frame is an ACK frame for the REQUEST frame. Preferably, the NOTIFY frame uses a different preamble type from the preamble type of the REQUEST frame, although the preamble type is the counterpart of the preamble type of the REQUEST frame. For example, the Preamble Type 2 of the NOTIFY frame may carry different OFDM training symbols from those of the Preamble Type 1.

The control frame structures illustrated in FIG. 5 are very small in size, compared to the control frame structures illustrated in FIG. 4. Therefore, the former can reduce network load, suitably for high-speed communication. Since the control frames illustrated in FIG. 5 do not include fields indicating transmitting and receiving entities for control frames, the transmitting and receiving entities are difficult to identify. However, this problem can be solved by later-described data channel reservation methods.

3. Data Channel Reservation Methods

Embodiments of the present invention provide new data channel reservation methods using the new frame structures described before with reference to FIG. 5. In addition, a new time interval IFS is proposed to implement the new data channel reservation methods according to the present invention. With reference to FIG. 3, time durations such as DIFS, PIFS, and SIFS have been described before. In addition to them, the present invention defines a new time duration called Intermediate Inter-Frame Space (IIFS). It is assumed that the IIFS satisfies conditions given as

[Equation 1]

$$IIFS \geq SIFS + slot\_time \quad (1)$$

$$IIFS < DIFS \quad (2)$$

Referring to [Equation 1], it is preferred that the duration of the IIFS is equal to or longer than the sum of the SIFS and a slot time (slot_time) and shorter than the DIFS. An SN transmitting a REQUEST frame may determine the reception time of a NOTIFY frame in spite of a time delay. The slot time is set, taking into account times such as a Transmission-Reception (Tx-Rx) (or Rx-Tx) round trip time, an energy detection time, a propagation delay, etc. and the SN receives the NOTIFY time after the IIFS determined based on the slot time. Therefore, the SN can identify the NOTIFY frame despite a slight time delay. The DIFS is a distributed time frame interval in a WLAN system. Thus, if the IIFS is equal to or longer than the DIFS, a control frame may not be processed normally due to other nodes. Accordingly, the IIFS preferably satisfies the condition of [Equation 1].

Now a description will be given of new data channel reservation methods using the REQUEST frame, the NOTIFY frame, and the IIFS according to embodiments of the present invention.

In the embodiments of the present invention, an SN transmitting a REQUEST frame may determine whether the REQUEST frame has been transmitted successfully and a data channel has been reserved, using the IIFS and the SIFS related to a reception time of a NOTIFY frame.

Figure 6:
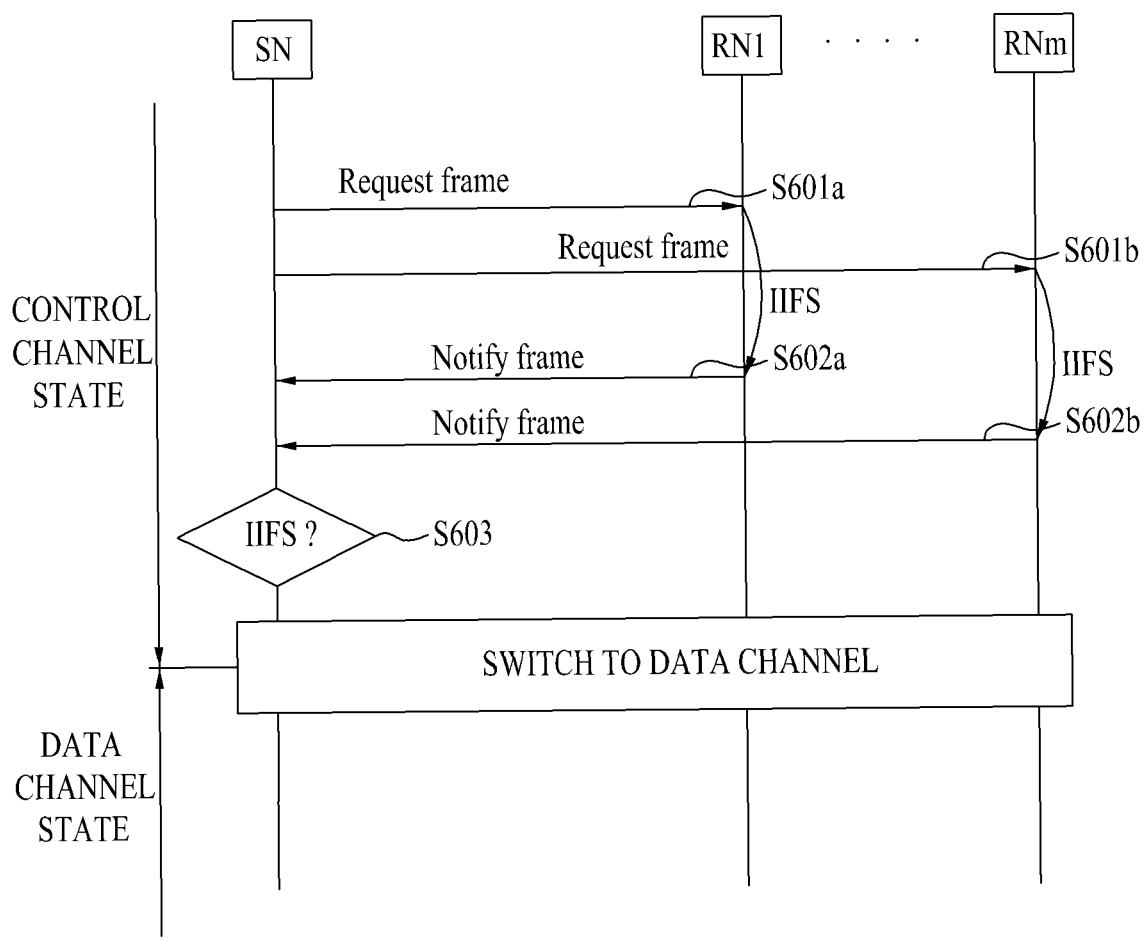
FIG. 6 is a diagram illustrating a signal flow for one of methods for reserving a data channel according to an embodiment of the present invention.
Figure 7:
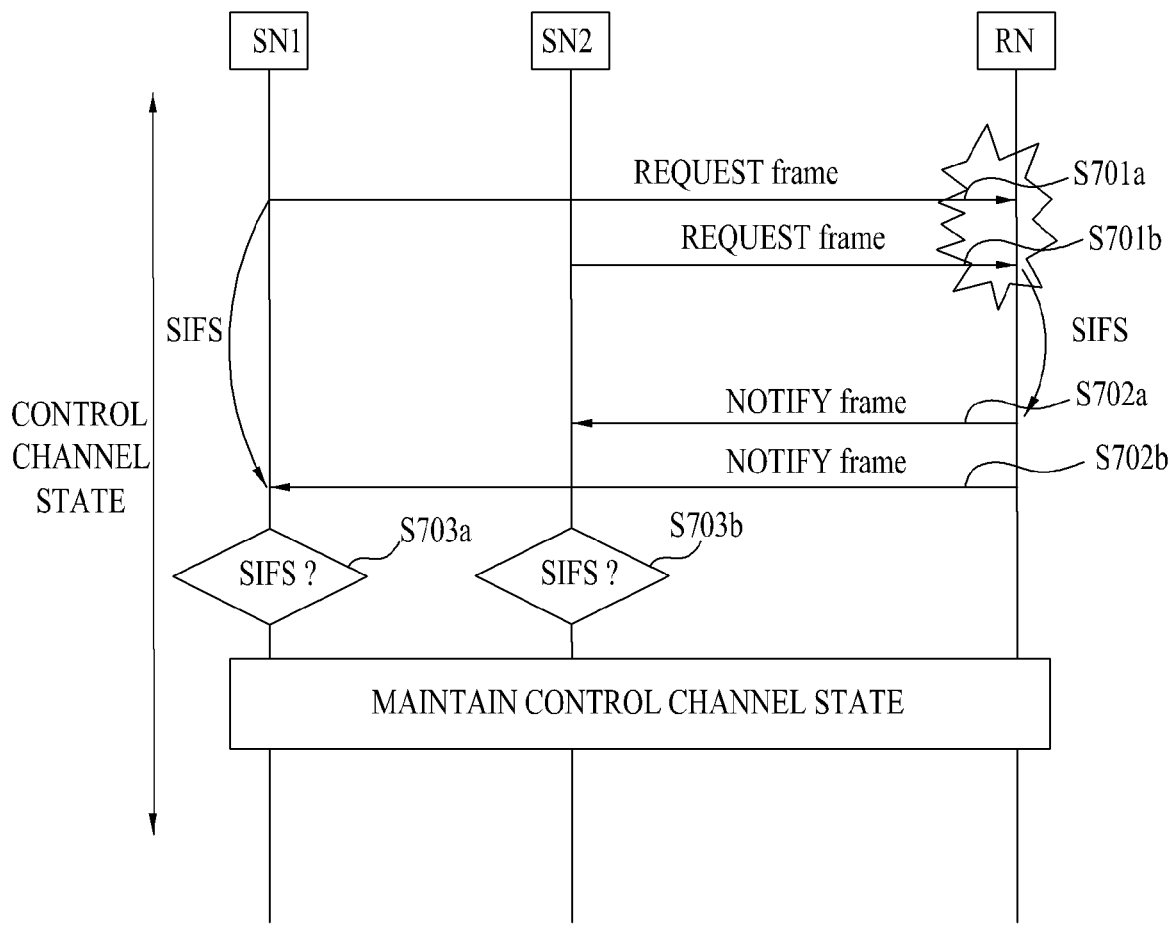
FIG. 7 is a diagram illustrating a signal flow for another method for reserving a data channel according to the embodiment of the present invention.

That is, if a NOTIFY frame is transmitted after the IIFS, the SN may determine that the REQUEST message has been transmitted without collision. On the other hand, if the NOTIFY frame is transmitted after the SIFS, the SN may determine that collision occurred to the REQUEST frame. FIGS. 6 and 7 illustrate data channel reservation methods using the IIFS and the SIFS.

FIG. 6 is a diagram illustrating a signal flow for one of data channel reservation methods according to an embodiment of the present invention.

Referring to FIG. 6, an SN may request reservation of a data channel by transmitting a REQUEST frame described before with reference to FIG. 5(a) on a control channel to all other nodes in a WLAN network (S601a and S601b).

If collision does not occur to the REQUEST frame, all RNs receiving the REQUEST frame transmit NOTIFY frames described before with reference to FIG. 5(b) to the SN during the IIFS (S602a and S602b).

The RNs may transmit the NOTIFY frames to the specific SN transmitting the REQUEST frame or to all other nodes in the WLAN network in steps S602a and S602b.

Upon receipt of the NOTIFY frames, the SN determines whether the received NOTIFY frames have been transmitted within the IIFS. That is, the SN may determine whether the REQUEST frame has been transmitted successfully, based on the reception times of the NOTIFY frames (S603).

The SN that has received the NOTIFY frames within the IIFS switches to a data channel to transmit data to the RNs in step S603. All RNs enter a Data Channel (DC) state to receive data after transmitting the NOTIFY frames.

FIG. 7 is a diagram illustrating a signal flow for another data channel reservation method according to the embodiment of the present invention.

It is assumed that one or more SNs SN1 and SN2 exist in a WLAN network and as SN1 and SN2 transmit REQUEST frames simultaneously, the REQUEST frames collide with each other (S701a and S701b).

An RN can be aware of the occurrence of collision between the REQUEST frames by checking the FCSs of the REQUEST frames. Therefore, the RN may notify SN1 and SN2 of the collision between the REQUEST frames by transmitting a NOTIFY frame to them during the SIFS, not during the IIFS (S702a and S702b).

The RN may transmit the NOTIFY frame to the specific SNs transmitting the REQUEST frames or to all other nodes in the WLAN network in steps S702a and S702b.

SN1 and SN2 may determine that collision has occurred to their transmitted REQUEST frames, as they detect the reception of the NOTIFY frame during the SIFS, not during the IIFS (S703a and S703b).

That is, the SNs may determine the transmission results of their REQUEST frames based on the reception time of the NOTIFY frame. Because of the collision, all nodes are kept in a Control Channel (CC) state, without switching to a DC state. The SNs that transmitted the REQUEST frames may perform a random backoff operation and set a random backoff counter.

Figure 8:
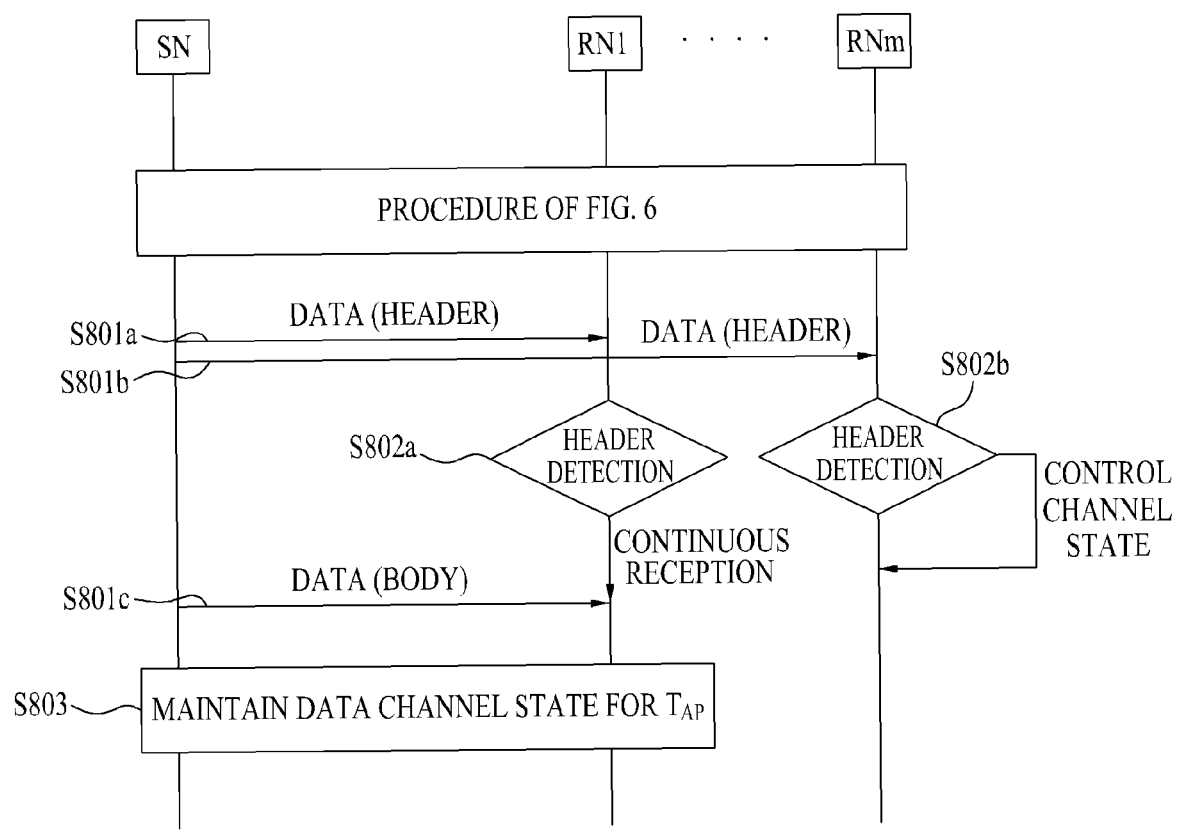
FIG. 8 is a diagram illustrating a signal flow for a method for transmitting and receiving data on a reserved data channel according to an embodiment of the present invention.

FIG. 8 is a diagram illustrating a signal flow for one of methods for transmitting and receiving data on a reserved data channel according to an embodiment of the present invention.

Specifically, FIG. 8 illustrates a data transmission method after a REQUEST frame is transmitted without collision and thus a data channel is reserved in the procedure of FIG. 6. That is, FIG. 8 describes an operation subsequent to the procedure of FIG. 6.

Referring to FIG. 8, an SN that has reserved a data channel determines whether the data channel is idle for the DIFS and if the data channel is idle for the DIFS, the SN starts to transmit a data frame to RNs (S801a and S801b).

Upon receipt of the data channel, all RNs first detect the header of the data frame (S802a and S802b).

Upon detection of the header, the RNs may determine whether the data channel is directed to them. In general, the header includes the address or ID of an SN and the address or ID of an RN. Therefore, the RNs can be aware of the destination of the data.

When any RN (e.g. RN1) determines that the data is directed to it, the RN may receive an entire data body, staying on the data channel (S801c).

An RN, for example, RN2 that determines the data frame is not directed to it switches to the CC state immediately and performs the data channel reservation method illustrated in FIGS. 6 and 7.

In this manner, each node does not need preserve reservation information such as a NAV of a data channel, compared to a CCC MAC mechanism based on an RTS/CTS frame described with reference to FIG. 4 according to the present invention.

In the illustrated case of FIG. 8, the SN and RN1 transmit and receive a data frame. After the data frame is completely transmitted, each node typically returns to a control channel. However, the nodes that have transmitted and received a data frame stay on a data channel for an additional time period, without immediately returning to the control channel in the embodiments of the present invention.

The additional short period $T_{AP}$ for which the SN and RNs stay on the data channel is computed by [Equation 2].

[Equation 2]

$$T_{AP} = DIFS + T_{HDR}$$

It is noted from [Equation 2] that $T_{AP}$ is set to the sum of the DIFS and $T_{HDR}$. $T_{HDR}$ is a time required for an RN to decode the header of a data frame.

Referring to FIG. 8 again, after data transmission and reception, the SN and RN1 are maintained in the DC state for the time period of $T_{AP}$, thus monitoring additional data transmission and reception. Thus, the use of a data channel can be enhanced.

Therefore, as the SN and the RN that have transmitted and received a data frame are kept in the DC state for $T_{AP}$, they may transmit and receive another data frame immediately without the need for performing the data channel reservation methods described with reference to FIGS. 6, 7 and 8 again.

Figure 9:
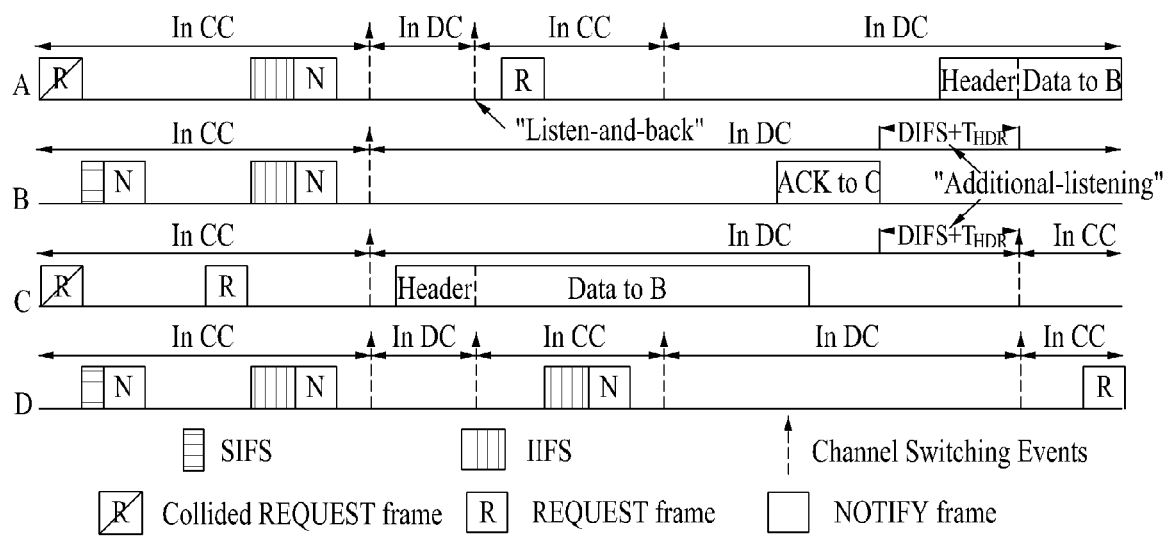
FIG. 9 illustrates implementation of the methods illustrated in FIGS. 5 to 8 in a multi-node environment according to an embodiment of the present invention.

FIG. 9 illustrates implementation of the methods illustrated in FIGS. 5 to 8 in a multi-node environment according to an embodiment of the present invention.

In FIG. 9, it is assumed that Node A, Node B, Node C and Node D exist in a collision environment. Each node may act as an SN or an RN.

Referring to FIG. 9, each node is in a CC state and Node A and Node B transmit REQUEST frames to other nodes. Since the simultaneously transmitted REQUEST frames collides, RNs, i.e. Node B and Node C transmit NOTIFY frames to Node A and Node C after the SIFS.

Upon detection of the NOTIFY frames after the SIFS, Node A and Node B are aware of the collision between the REQUEST frames and thus are maintained in the CC state. To reserve a data channel after a random backoff, Node C transmits a REQUEST frame to all other nodes. Herein, it is assumed that a data channel is successfully reserved for Node C without collision to the REQUEST frame. Therefore, the other RNs, Node A, Node B and Node D transmit NOTIFY frames to Node C the IIFS later.

The nodes that has transmitted and received the NOTIFY frames are all switched to a DC state and await reception of a data frame. Node C reserving a data channel transmits a data frame. Node A, Node B and Node D first detect the header of the data frame and determine whether the data frame is directed to them. As the data frame is destined for Node B, other nodes except Node B immediately return to the CC state without decoding the body of the data frame. After receiving the data frame, Node B transmits an ACK frame to each node after the SIFS. Herein, after the data frame transmission and reception, Node B and Node C may monitor whether another data frame is transmitted for the time period of $T_{AP}$ depicted in [Equation 2] without immediately switching to the CC state.

In the meantime, after determining that the data frame transmitted by Node C is not directed to them and thus switching to the CC state, Node A and Node D may perform a data channel reservation operation. Accordingly, Node A transmits a REQUEST frame to each node and upon receipt of the REQUEST frame, Node B transmits a NOTIFY frame to Node A after the IIFS.

As a reserved data channel is intended for data to be transmitted to Node B, Node A waits until a data frame transaction ends between Node B and Node C. The data frame transaction may last for the time period of the length of the data frame, the SIFS, the length of the ACK frame, and the DIFS. In addition, even though Node B and Node C complete their data frame transmission and reception, they may monitor whether there is another data transmission for $T_{AP}$ after Node B transmits the ACK frame. Upon receipt of the ACK frame indicating an ACK from Node B, Node A may determine that Node B is still on the data channel. Thus, Node B immediately transmits a data frame to Node B.

Node C and Node D, which have been monitoring the data channel, decode the header of the data frame received from Node A and immediately switch to the CC state, determining that the data frame is not directed to them.

Figure 10:
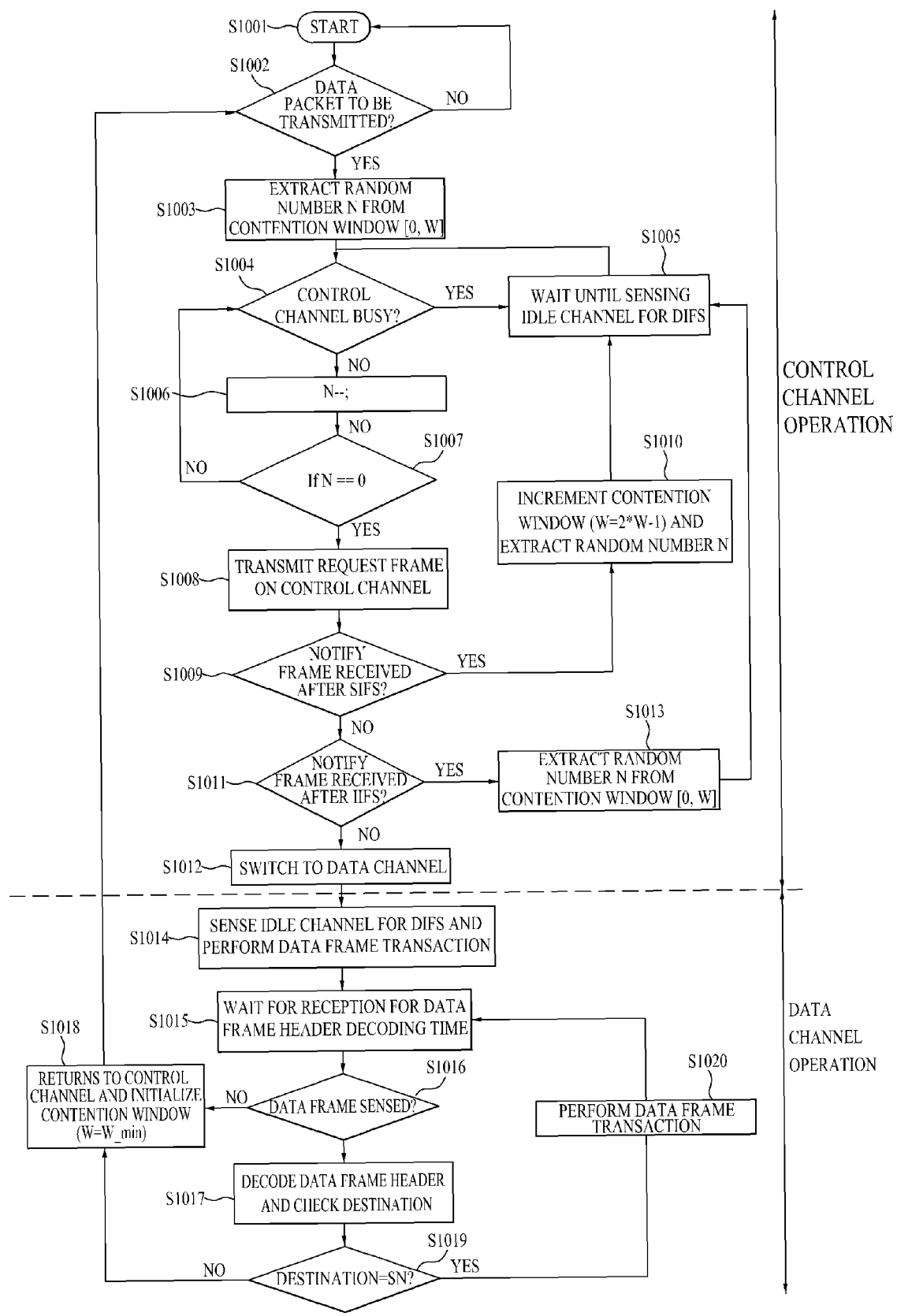
FIG. 10 is a flowchart illustrating a method for reserving a data channel at a Sending Node (SN) according to an embodiment of the present invention.

FIG. 10 is a flowchart illustrating a data channel reservation method of an SN according to an embodiment of the present invention.

Referring to FIG. 10, the SN starts a data channel reservation operation (S1001).

The SN determines whether there is a data frame to be transmitted (S1002).

The SN extracts a random number N from a contention window [0, W] (S1003).

The SN determines whether a control channel is busy (S1004).

If the control channel is busy, the SN waits until it detects an idle control channel for the DIFS (S1005). If the control channel is idle, the SN decrements the random number N and if N is not 0, the SN transmits a REQUEST frame (S1006, S1007, and S1008).

The SN monitors reception of a NOTIFY frame after the SIFS (S1009).

Upon receipt of the NOTIFY frame after the SIFS, which means that the REQUEST frame has been collided, the SN increments the contention window ($W_n=2 \times W_{n-1}-1$) and extracts a random number N again (S1010). The SN waits until sensing an idle control channel for the DIFS (S1005). The SN, which has not received a NOTIFY frame after the SIFS, monitors reception of a NOTIFY frame after the IIFS (S1011).

Upon receipt of a NOTIFY frame after the IIFS, which means that a data channel has been successfully reserved, the SN switches to a data channel (S1012).

On the other hand, if the SN has failed to receive a NOTIFY frame after the IIFS, the SN extracts a random number N from the contention window [0, W] (S1013) and waits until sensing an idle control channel for the DIFS (S1005).

After switching to the DC state in step S1012, the SN monitors whether the data channel is idle for the DIFS and if the data channel is idle for the DIFS, the SN starts a data transaction. The data transaction is a process of transmitting a data frame, lasting for a time period corresponding to the sum of a data frame length, the SIFS, the length of an ACK frame, and the DIFS (S1014).

After the data transaction is completed, the SN stays on the data channel and monitors whether a data frame is transmitted from another node, for a predetermined time $T_{HDR}$ required to decode the header of a data frame (S1015).

Upon sensing a data frame from another node, the SN decodes the header of the data frame and determines the destination of the data frame (S1016 and S1017).

If a data frame from another node is not sensed in step S1016, the SN returns to the CC state and initializes the contention window (W=W_min) (S1018).

On the other hand, if the destination of the data frame is the SN, the SN performs a data frame transaction to receive the data frame (S1019 and S1020). If the destination of the data frame is not the SN, the SN returns to the CC state and initializes the contention window (S1019 and S1018).

Upon completion of the data frame transaction in step S1020, the SN monitors whether there is another data frame transmission for $T_{HDR}$ (S1015).

Figure 11:
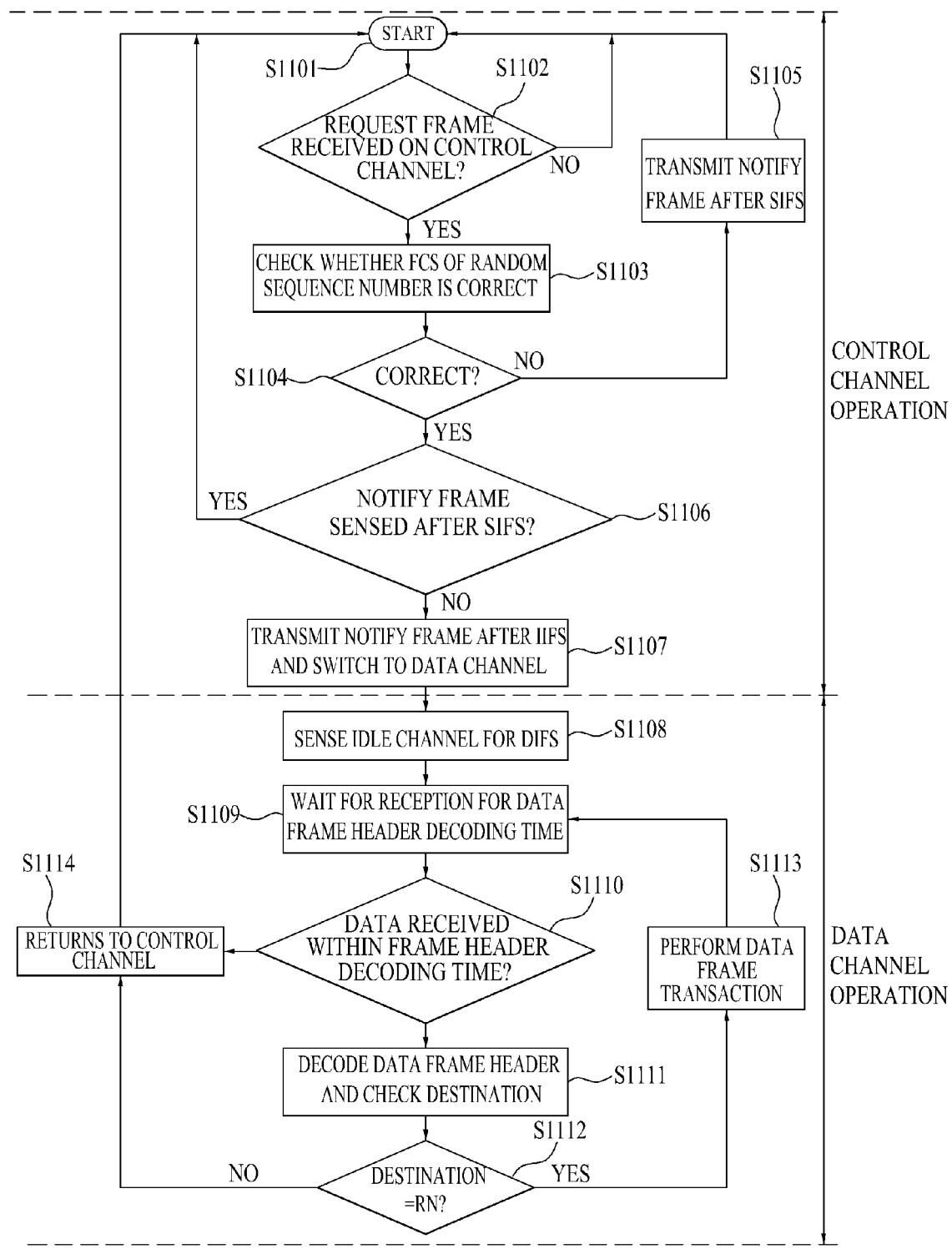
FIG. 11 is a flowchart illustrating a method for reserving a data channel at a Receiving Node (RN) according to an embodiment of the present invention.

FIG. 11 is a flowchart illustrating a data channel reservation method of an RN according to an embodiment of the present invention.

Referring to FIG. 11, the RN starts a data channel reservation operation (S1101).

The RN monitors whether a REQUEST frame is received on a control channel (S1102).

Upon receipt of the REQUEST frame, the RN determines whether the FCS of a random SN is correct (S1103).

If the FCS is correct, the RN transmits a NOTIFY frame after the SIFS (S1104 and S1105).

If the FCS is not correct in step S1104, the RN monitors detection of a NOTIFY frame after the SIFS (S1006).

Upon detection of the NOTIFY frame, the RN returns to step S1101. If the NOTIFY frame is not detected, the RN transmits a NOTIFY frame after the IIFS and switches to a data channel (S1107).

The RN monitors an idle control channel for the DIFS (S1108) and awaits reception of a data frame during a decoding time of a data frame header (S1109).

Upon sensing a data frame header for the header decoding time, the RN decodes the header of a data frame and checks the destination of the data frame (S1110 and S1111).

If the destination of the data frame is the RN, the RN performs a data frame transaction (S1113). After the data frame transaction, the RN returns to step S1109 and monitors transmission of another data frame.

Meanwhile, if the RN has not received the header of a data frame in step S1110, the RN returns to the control channel (S1114).

Figure 12:
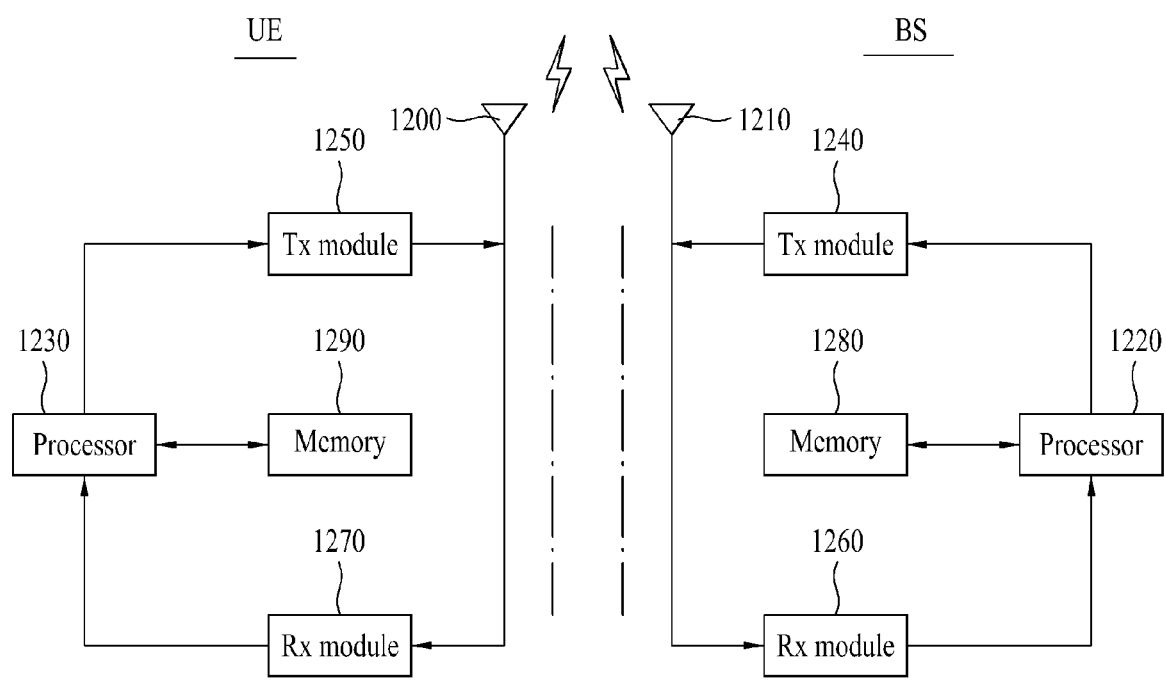
FIG. 12 is a block diagram of a User Equipment (UE) and a Base Station (BS), for implementing the embodiments of the present invention illustrated in FIGS. 5 to 11, according to an embodiment of the present invention.

FIG. 12 is a block diagram of a UE and a BS, for implementing the embodiments of the present invention illustrated in FIGS. 5 to 11, according to an embodiment of the present invention.

The UE may serve as an SN on the uplink and as an RN on the downlink. The BS may serve as an RN on the uplink and as an SN on the downlink. That is, the UE and the BS may acts as an SN and an RN depending on whether they transmit or receive a control frame or a data frame.

Each of the BS and the UE may include a Tx module 1240 or 1250 for transmitting information, data, and/or messages, an Rx module 1260 or 1270 for receiving information, data, and/or messages, and an antenna 1210 or 1200. Each of the BS and the UE may further include a processor 1220 or 1230 for performing the afore-described embodiments of the present invention and a memory 1280 or 1290 for temporarily or permanently storing data generated during processing of the processor 1220 or 1230.

The Tx modules 1240 and 1250 and the Rx modules 1260 and 1270 in the BS and the UE may perform a packet modulation/demodulation function, a high-speed packet channel coding function, an Orthogonal Frequency Division Multiple Access (OFDMA) packet scheduling function, a Time Division Duplex (TDD) packet scheduling, and/or a channel multiplexing function.

The apparatuses illustrated in FIG. 12 are capable of implementing the control frames and methods illustrated in FIGS. 5 to 11. That is, the embodiments of the present invention can be implemented using the above-described components and functions of the UE and the BS.

Meanwhile, the UE may be any of a Personal Digital Assistant (PDA), a cellular phone, a Personal Communication Service (PCS) phone, a Global System for Mobile (GSM) phone, a Wideband Code Division Multiple Access (WCDMA) phone, a Mobile Broadband System (MBS) phone, a handheld PC, a laptop PC, a smart phone, a Multi Mode-Multi Band (MM-MB) terminal, etc.

The smart phone is a terminal taking the advantages of both a mobile phone and a PDA. It incorporates the functions of a PDA, that is, scheduling and data communications such as fax transmission and reception and Internet connection into a mobile phone. The MB-MM terminal refers to a terminal which has a multi-modem chip built therein and which can operate in any of a mobile Internet system and other mobile communication systems (e.g. CDMA 2000, Wideband CDMA (WCDMA), etc.)

Embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the methods according to the embodiments of the present invention may be implemented in the form of a module, a procedure, a function, etc. performing the above-described functions or operations. For example, software code may be stored in the memories 1280 and 1290 and executed by processors 1220 and 1230. The memories are located at the interior or exterior of the processors and may transmit and receive data to and from the processors via various known means.

Figure 13:
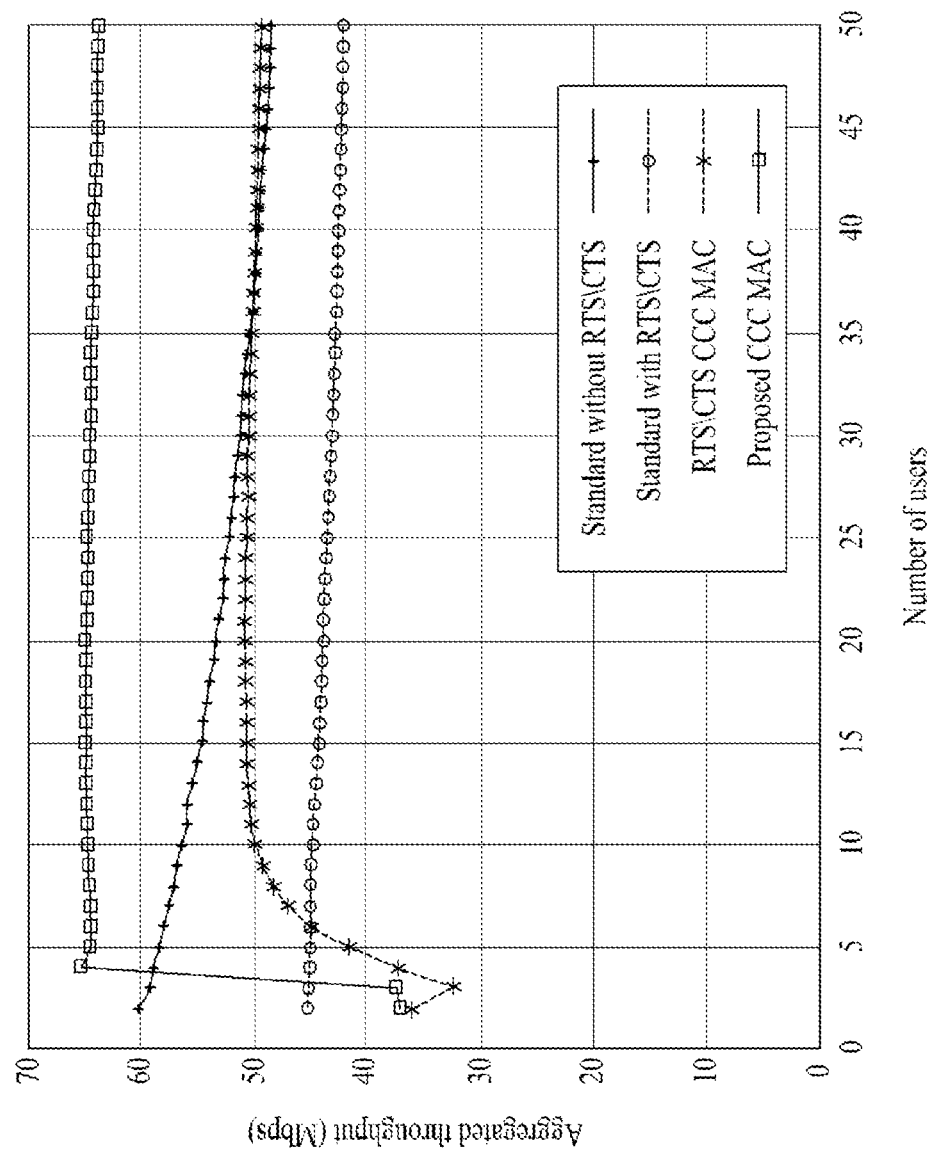
FIG. 13 is a graph illustrating results of a simulation using the embodiments of the present invention.

FIG. 13 is a graph illustrating results of a simulation using the embodiments of the present invention.

The simulation was performed on an operation with RTS/CTS, an operation without RTS/CTS, an RTS/CTS operation based on a CCC MAC protocol, and the CCC MAC protocol operation proposed according to the embodiments of the present invention.

Each node operates under the following simulation parameters and conditions.

TABLE 1

| | |
|---|---:|
| Total Bandwidth | 40 MHz |
| Switching Time | 30 us |
| Preamble | 16 us |
| SIFS/IIFS/DIFS | 10/19/34 us |
| Data Frame Size | 2304 bytes |
| RTS/CTS Frame Size | 160/112 bits |

In the simulation, it is assumed that each node uses a single transmitter at the same data rate within the same collision domain. It is also assumed that all nodes have a limitless data packet residual amount and the destinations of data packets are distributed randomly over a network.

In case of the RTS/CTS-based CCC MAC method, a bandwidth of 10 MHz is required, whereas a bandwidth of 5 MHz is sufficient in the embodiments of the present invention. It is noted from FIG. 13 that the present invention has a very high throughput except for the case of two or three nodes.

As is apparent from the above description, the embodiments of the present invention have the following effects.

First of all, owing to the use of the new control frame structures in reserving a data channel in a high-speed communication environment, radio resources can be more efficiently utilized.

As a new time duration IFS used for data channel reservation is defined, a used bandwidth can be reduced using small-size control frames.

Further, control overhead can be decreased and system performance can be increased by using new data channel reservation methods using new control frame structures and a new time duration and apparatuses supporting the same.

The embodiments of the present invention are applicable to various wireless access systems. The various wireless access systems include, for example, a 3GPP system, a 3GPP2 system, and/or an IEEE 802.xx system. Besides the various wireless access systems, the embodiments of the present invention are applicable to all technical fields being applications of the various wireless access systems.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an exemplary embodiment of the present invention or included as a new claim by a subsequent amendment after the application is filed.

What is claimed is:

1. A method for reserving a data channel in a wireless access system, the method performed by a sending node and comprising:
   transmitting a request frame for reserving the data channel; and
   receiving a notify frame in response to the request frame after a first time period or after a second time period,
   wherein the sending node determines that the request frame has been collided when the notify frame is received after the first time period expires but before the second time period expires, and the sending node determines that the data channel has been reserved successfully when the notify frame is received after the second time period expires, and
   wherein the first time period is a Short Inter-Frame Space (SIFS) and the second time period is an Intermediate Inter-Frame Space (IIFS) which is configured with the SIFS and a slot time.

2. The method according to claim 1, further comprising:
   transmitting a data frame on a data channel, when the notify frame is received after the second time period expires.

3. The method according to claim 2, further comprising:
   monitoring whether another data frame is received on the data channel for a third time period without immediately switching to a control channel, when the data frame is completely transmitted,
   wherein the third time period is configured with a Distribution Coordination Function (DCF) Inter-Frame Space (DIFS) and a header detection time required to detect a header of the data frame.

4. The method according to claim 1, wherein the slot time is set by taking into account at least one of a round trip delay, an energy detection time, and a propagation delay.

5. A method for reserving a data channel in a wireless access system, the method performed by a receiving node and comprising:
   receiving a first request frame for reserving the data channel from a sending node; and
   transmitting a notify frame to the sending node after a first time period expires but before a second time period expires, if the first request frame collides with a second request frame received from another sending node; or
   transmitting the notify frame to the sending node after the second time period expires, if the first request frame does not collide with the second request frame,
   wherein the first time period is a Short Inter-Frame Space (SIFS) and the second time period is an Intermediate Inter-Frame Space (IIFS) which is configured with the SIFS and a slot time.

6. The method according to claim 5, after transmitting the notify frame after the second time period expires, further comprising:
   decoding a header of a data frame received from the sending node; and
   decoding a body of the data frame if the header indicates the receiving node is a destination; or
   returning to a control channel if the header does not indicate the receiving node as the destination.

7. The method according to claim 6, further comprising:
   monitoring whether another data frame is received on the data channel for a third time period without immediately switching to the control channel, when the data frame is completely received,
   wherein the third time period is configured with a Distribution Coordination Function (DCF) Inter-Frame Space (DIFS) and a header detection time required to detect a header of the data frame.

8. The method according to claim 5, wherein the slot time is set by taking into account at least one of a round trip delay, an energy detection time, and a propagation delay.

9. A sending node supporting a method for reserving a data channel in a wireless access system, the sending node comprising:
   a transmission module for transmitting a radio frame;
   a reception module for receiving a radio frame; and
   a processor supporting the method for reserving the data channel,
   wherein the transmission module transmits a request frame for reserving the data channel,
   the reception module receives a notify frame in response to the request frame after a first time period or after a second time period, and
   the processor determines that the request frame has been collided when the notify frame is received after the first time period expires but before the second time period expires and determines that the data channel has been reserved successfully when the notify frame is received after the second time period expires, and
   wherein the first time period is a Short Inter-Frame Space (SIFS) and the second time period is an Intermediate Inter-Frame Space (IIFS) which is configured with the SIFS and a slot time.

10. The sending node according to claim 9, wherein if the notify frame is received after the second time period expires, the sending node transmits a data frame on a data channel by using the transmission module.

11. The sending node according to claim 10, wherein when the data frame is completely transmitted, the processor monitors whether another data frame is received on the data channel for a third time period without immediately switching to a control channel, and the third time period is configured with a Distribution Coordination Function (DCF) Inter-Frame Space (DIFS) and a header detection time required to detect a header of the data frame.

12. The sending node according to claim 9, wherein the slot time is set by taking into account at least one of a round trip delay, an energy detection time, and a propagation delay.

13. A receiving node supporting a method for reserving a data channel in a wireless access system, the receiving node comprising:
   a transmission module for transmitting a radio frame;
   a reception module for receiving a radio frame; and
   a processor supporting the method for reserving the data channel,
   wherein the reception module receives a first request frame for reserving the data channel from a sending node, and
   the transmission module transmits a notify frame to the sending node after a first time period expires but before a second time period expires when the first request frame collides with a second request frame received from another sending node, or transmits the notify frame to the sending node after the second time period expires when the first request frame does not collide with the second request frame, and
   wherein the first time period is a Short Inter-Frame Space (SIFS) and the second time period is an Intermediate Inter-Frame Space (IIFS) which is configured with the SIFS and a slot time.

14. The receiving node according to claim 13, wherein after the notify frame is transmitted after the second time period expires, the processor decodes a header of a data frame received from the sending node, and further decodes a body of the data frame if the header indicates the receiving node in a destination, or returns to a control channel if the header does not indicate the receiving node as the destination.

15. The receiving node according to claim 14, wherein when the data frame is completely received, the processor monitors whether another data frame is received on the data channel for a third time period without immediately switching to the control channel, and the third time period is configured with a Distribution Coordination Function (DCF) Inter-Frame Space (DIFS) and a header detection time required to detect a header of the data frame.

16. The receiving node according to claim 13, wherein the slot time is set by taking into account at least one of a round trip delay, an energy detection time, and a propagation delay.

* * * * *